US009523973B2

(12) United States Patent
Lu et al.

(10) Patent No.: US 9,523,973 B2
(45) Date of Patent: Dec. 20, 2016

(54) ELECTRONIC DEVICE AND METHOD FOR CONTROLLING HOUSEHOLD APPLIANCES

(71) Applicants: Fu Tai Hua Industry (Shenzhen) Co., Ltd., Shenzhen (CN); Hon Hai Precision Industry Co., Ltd., New Taipei (TW)

(72) Inventors: Xin Lu, Shenzhen (CN); Huan-Huan Zhang, Shenzhen (CN); Shih-Fang Wong, New Taipei (TW); Dan Cao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 416 days.

(21) Appl. No.: 14/259,284

(22) Filed: Apr. 23, 2014

(65) Prior Publication Data

US 2014/0324225 A1    Oct. 30, 2014

(30) Foreign Application Priority Data

Apr. 24, 2013    (CN) .......................... 2013 1 01439685

(51) Int. Cl.
*G05B 13/00*    (2006.01)
*G05B 15/02*    (2006.01)

(52) U.S. Cl.
CPC ....... *G05B 15/02* (2013.01); *G05B 2219/2613* (2013.01)

(58) Field of Classification Search
CPC ..................................................... G05B 15/02
See application file for complete search history.

(56) References Cited

U.S. PATENT DOCUMENTS

| 2005/0094610 A1* | 5/2005 | de Clerq | ................ G05B 15/02 370/338 |
| 2014/0236358 A1* | 8/2014 | Sasaki | .................... G08C 17/00 700/275 |
| 2014/0249657 A1* | 9/2014 | Yurasits | ................ G05B 15/02 700/90 |
| 2015/0010167 A1* | 1/2015 | Arling | .............. H04N 21/42226 381/105 |

* cited by examiner

*Primary Examiner* — Philip Wang
(74) *Attorney, Agent, or Firm* — Zhigang Ma

(57) ABSTRACT

A household appliance control method sets a number of orientations of a number of household appliances in a particular area. Each orientation corresponds to one of the household appliances. A sliding operation applied to a touch screen of an electronic device is obtained. When a direction of the sliding operation matches the orientation of one of the household appliances, a control signal is sent to a corresponding household appliance to control the household appliance to perform a corresponding function.

14 Claims, 5 Drawing Sheets

ELECTRONIC DEVICE AND METHOD FOR CONTROLLING HOUSEHOLD APPLIANCES

FIELD

The present disclosure relates to an electronic device and a method for control household appliances.

BACKGROUND

Smart household appliances, such as air-conditioners, televisions, refrigerators, washers, and other similar appliances, can be controlled by a mobile terminal (e.g., a smart phone, a mobile Internet device, or other similar device). In a common control method, each of the household appliances may need to be displayed on a screen of the mobile terminal to allow an operator to select a household appliance to control.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Reference will be made to the drawings to describe various embodiments.

Figure 1:
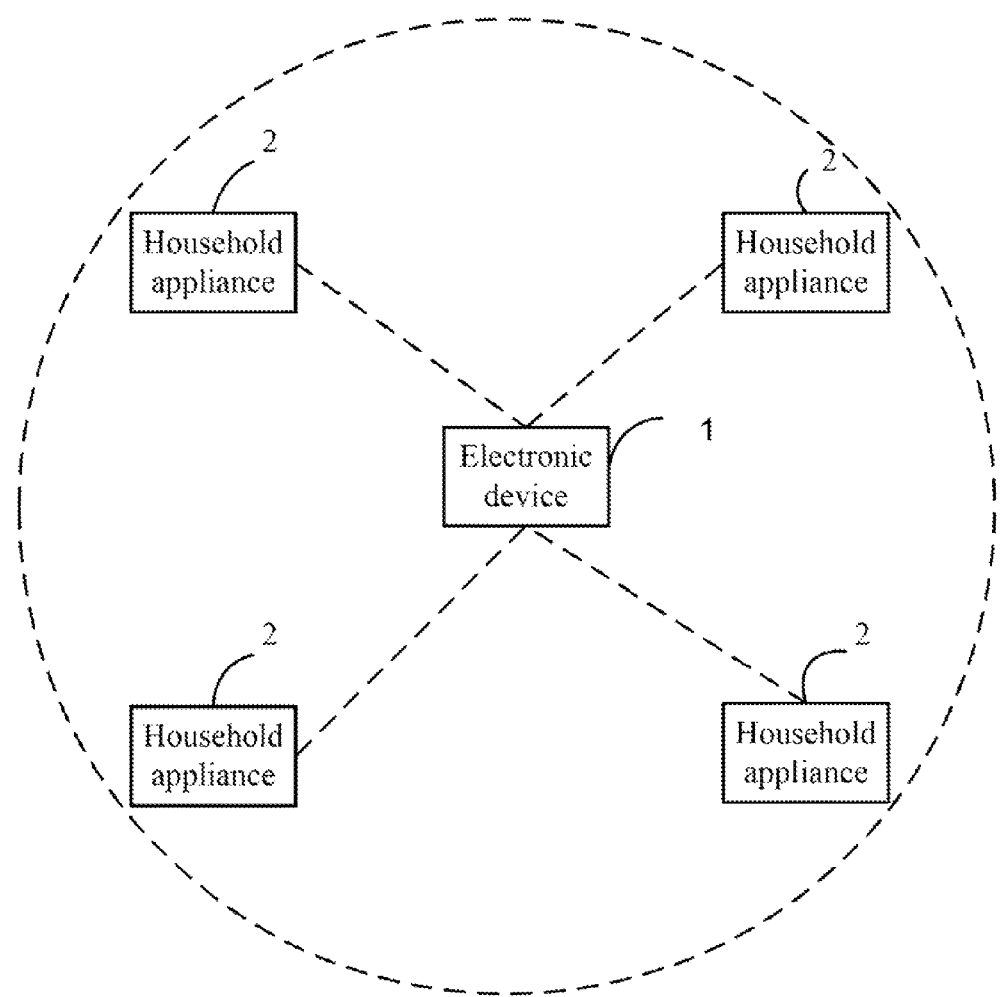
FIG. 1 is a diagram of an embodiment of a plurality of household appliances communicating with an electronic device in a particular area.

FIG. 1 shows a diagram of an embodiment of a plurality of household appliances 2 communicating with an electronic device 1 in a particular area. The household appliances 2 can be televisions, washers, air-conditioners, refrigerators, or other similar appliances. The electronic device 1 may communicate with each of the household appliances 2 through wireless communication technologies, such as BLUETOOTH® and WIFI®. The particular area may be a room. The electronic device 1 can be a smart phone, a panel computer, a mobile Internet device (MID), or other similar device.

Figure 2:
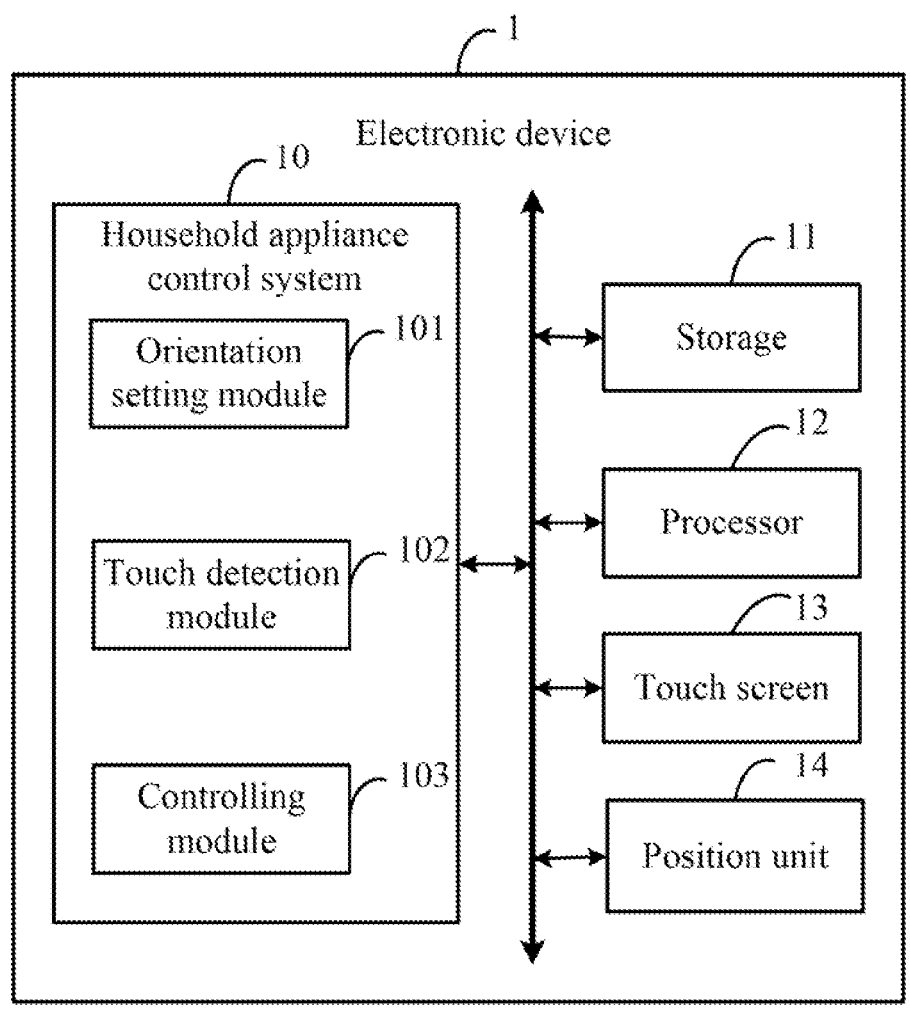
FIG. 2 is a block diagram of the electronic device including a household appliance control system.

FIG. 2 shows a block diagram of the electronic device 1 including a household appliance control system 10. The electronic device 1 can further include a storage 11, a processor 12, a touch screen 13, and a position unit 14. FIG. 2 shows one example of the electronic device 1, and the electronic device 1 can include more or fewer components than those shown in the figure, or have a different configuration of the components. The position unit 14 can be a global positioning system (GPS).

The household appliance control system 10 can include a plurality of programs in the form of one or more computerized instructions stored in the storage 11 and executed by the processor 12 to perform operations of the electronic device 1. In one embodiment, the household appliance control system 10 includes an orientation setting module 101, a touch detection module 102, and a controlling module 103. In general, the word "module," as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

The orientation setting module 101 sets an orientation of each of the household appliances 2 in the particular area. The orientation of each of the household appliances 2 can be stored in the storage 11.

In at least one embodiment, an orientation detecting application (not shown) is installed in the electronic device 1 and executed by the processor 12. The orientation detecting application includes a compass. When the orientation detecting application is executed, a reference direction (e.g., north) is determined. The orientation setting module 101 sets an orientation of each of the household appliances 2 according to the reference direction. For example, an orientation of a television is north, an orientation of a computer is south, an orientation of a disinfection cabinet is west, and an orientation of a water heater is east.

Figure 3:
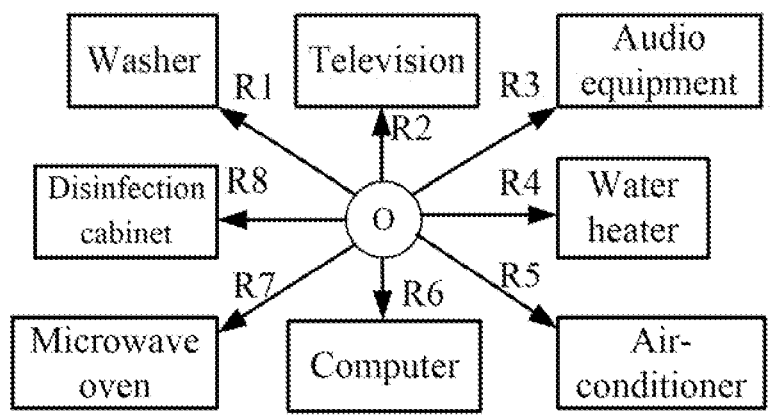
FIG. 3 is a diagram of distributions of the plurality of household appliances in the particular area.

In other embodiments, the orientation setting module 101 sets the orientation of each of the household appliances 2 according to distributions of the household appliances 2 within the particular area. FIG. 3 shows an example of a distribution of the plurality of household appliances 2 in the particular area. The orientation setting module 101 allocates an orientation (e.g., R1, R2, . . . R8 as shown in FIG. 3) to each of the household appliances 2, according to the distribution of the household appliances 2. Each of the orientations R1-R8 corresponds to one household appliance 2.

The touch detection module 102 detects a sliding operation applied on the touch screen 13 and obtains a direction of the sliding operation on the touch screen 13. In the embodiment, the touch detection module 102 obtains the direction of the sliding operation according to a start point and an end point of the sliding operation. In the embodiment, the compass is displayed on the touch screen 13, when the household appliances 2 need to be controlled.

The controlling module 103 determines whether the direction of the sliding operation matches the orientation of one of the household appliances 2. When the direction of the sliding operation matches the orientation of one of the household appliances 2, the controlling module 103 sends a control signal to the corresponding household appliance 2. In detail, the controlling module 103 obtains the direction of the sliding operation via the orientation detecting application, and then obtains a relative direction between the direction of the sliding operation and the reference direction (e.g., north). The controlling module 103 compares the relative direction with the orientation of each of the household appliances 2. When an angle between the relative direction and the orientation of one of the household appliances 2 is within a predetermined range (e.g., 10 degrees), the controlling module 103 determines that the sliding operation matches the orientation of one of the household appliances 2 (hereinafter "the matched household appliance 2"), and the matched household appliance 2 is defined to be a control object. Further, a controlling menu including a plurality of options of the matched household appliance 2 is displayed on the touch screen 13, and the control signal is sent to the matched household appliance 2 when an option is selected.

Figure 4:
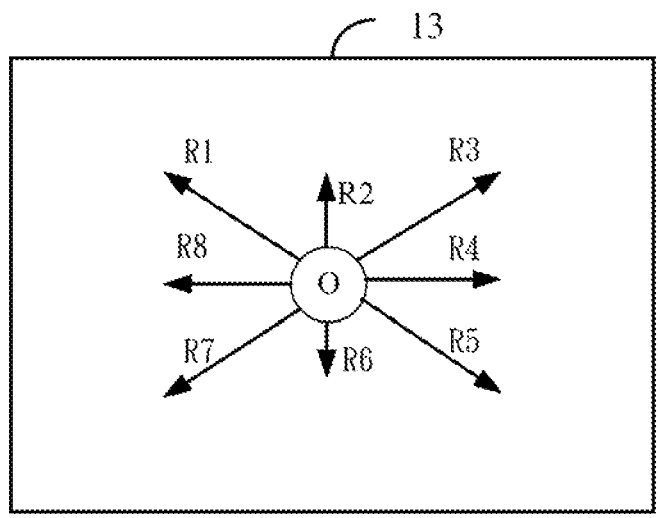
FIG. 4 is a diagram of a plurality of operation directions in the electronic device of FIG. 1.

In other embodiments, the touch screen 13 displays a selection interface (as shown in FIG. 4). The selection interface includes a plurality of guiding paths starting from a central point "O" of the touch screen 13, and each guiding path corresponds to one of the household appliances 2 to guide a user to slide along a corresponding guiding path to control the household appliances 2. When a sliding operation along a guiding path is detected, the control signal is sent to the matched household appliance 2.

Figure 5:
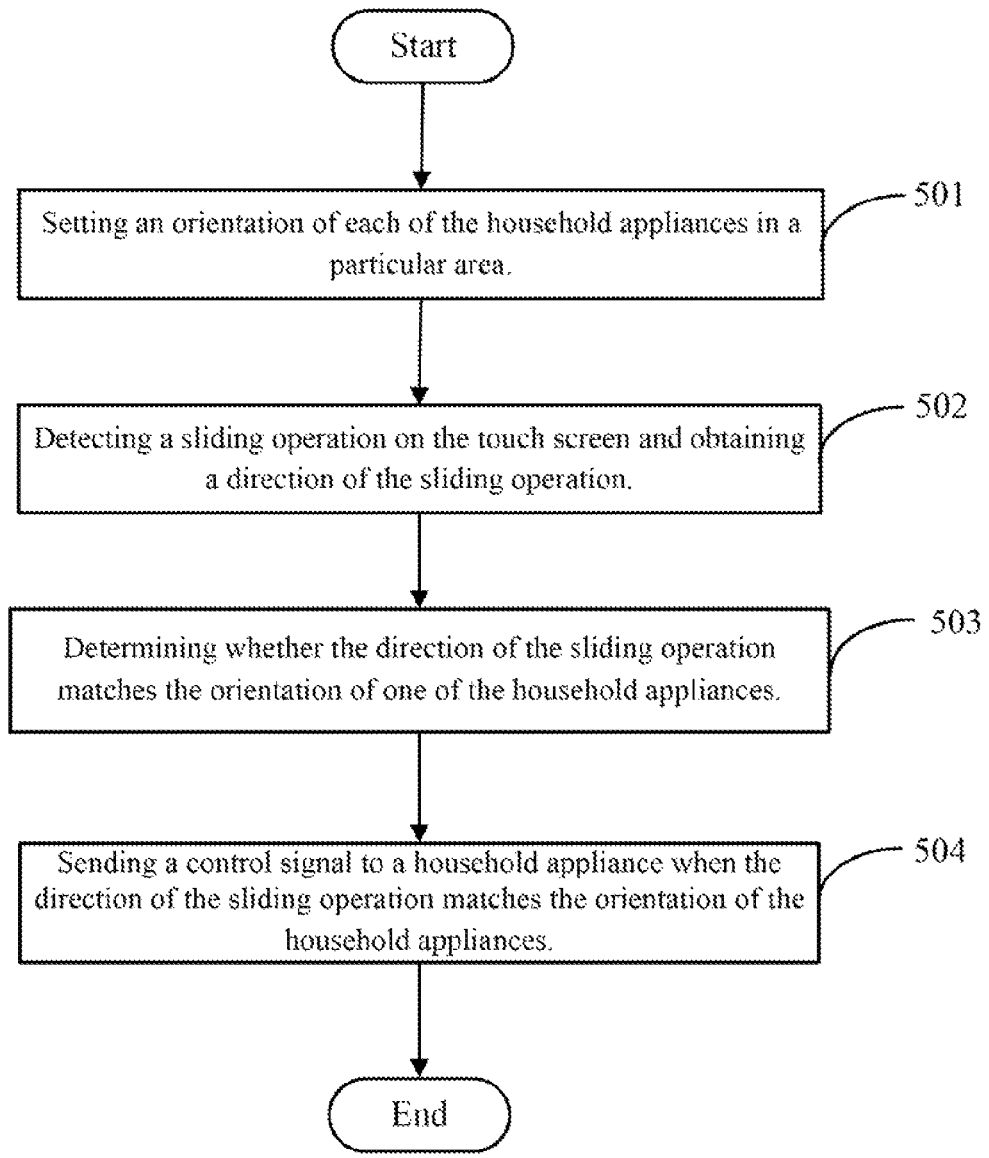
FIG. 5 is a flowchart of one embodiment of a household appliance control method.

FIG. 5 shows a flowchart of one embodiment of a household appliance selection method of the household appliance control system 10. Depending on the embodiment, additional steps may be added, others removed, and the ordering of the steps may be changed.

In 501, the orientation setting module sets an orientation of each of the household appliances in the particular area. The orientation of each of the household appliances can be stored in the storage.

In 502, the touch detection module detects a sliding operation applied on the touch screen and obtains a direction of the sliding operation.

In 503, the controlling module determines whether the direction of the sliding operation matches the orientation of one of the household appliances. When the direction of the sliding operation matches the orientation of one of the household appliances, 504 is performed.

In 504, the controlling module sends a control signal to the matched household appliance.

It is to be understood that even though numerous characteristics and advantages of the present embodiments have been set forth in the foregoing description, with details of the structures and functions of the embodiments, the disclosure is illustrative only; and changes may be in detail, especially in the matters of arrangement of parts within the principles of the embodiments to the full extent indicated by the broad general meaning of the terms in which the appended claims are expressed.

What is claimed is:

1. An electronic device, comprising:
   a processor;
   a storage;
   a touch screen; and
   one or more programs stored in the storage and executed by the processor to perform a household appliance control method, the household appliance control method comprising:
   setting an orientation of each of the household appliances in a particular area;
   detecting a sliding operation applied on the touch screen and obtaining a direction of the sliding operation;
   determining whether the direction of the sliding operation matches the orientation of one of the household appliances; and
   sending a control signal to a household appliance when the direction of the sliding operation matches the orientation of the household appliances.

2. The electronic device of claim 1, wherein the plurality of orientations of the household appliances are set according to distributions of the household appliances within the particular area.

3. The electronic device of claim 1, wherein an orientation detecting application is installed in the electronic device and is executed to determine a reference direction and the orientation of each of the household appliances is set according to the reference direction.

4. The electronic device of claim 1, wherein the direction of the sliding operation is obtained according to a start point and an end point of the sliding operation.

5. The electronic device of claim 4, wherein the method further comprises:
   obtaining a relative direction between the direction of the sliding operation and the reference direction; and
   comparing the relative direction with the orientation of each of household appliances, wherein when an angle between the relative direction and the orientation of a household appliance is in a predetermined range, the sliding operation is determined to match the household appliance, and the household appliance is controlled by the control signal.

6. The electronic device of claim 5, wherein a controlling menu comprises a plurality of options of the household appliance is displayed on the touch screen, and the control signal is sent to the household appliance when an option is operated.

7. The electronic device of claim 1, wherein a selection interface comprising a plurality of guiding paths started from a center of the touch screen, and each guiding path corresponds to one of the household appliances and is configured to guides a user to slide along a corresponding guiding path to control the household appliances; when a sliding operation sliding along one of the guiding paths is detected, the control signal is sent to a corresponding household appliance.

8. A household appliance control method executed by an electronic device having a touch screen, comprising:
   setting an orientation of each of the household appliances in a particular area;
   detecting a sliding operation applied on the touch screen and obtaining a direction of the sliding operation;
   determining whether the direction of the sliding operation matches the orientation of one of the household appliances; and
   sending a control signal to a household appliance when the direction of the sliding operation matches the orientation of the household appliances.

9. The household appliance control method of claim 8, wherein the plurality of orientations of the household appliances is set according to distributions of the household appliances within the particular area.

10. The household appliance control method of claim 8, wherein an orientation detecting application is installed in the electronic device and is executed to determine a reference direction and the orientation of each of the household appliances is set according to the reference direction.

11. The household appliance control method of claim 8, wherein the direction of the sliding operation is obtained according to a start point and an end point of the sliding operation.

12. The household appliance control method of claim 11, further comprising:
   obtaining a relative direction between the direction of the sliding operation and the reference direction; and comparing the relative direction with the orientation of each of household appliances, wherein when an angle between the relative direction and the orientation of a household appliance is in a predetermined range, the sliding operation is determined to match the household appliance, and the household appliance is controlled by the control signal.

13. The household appliance control method of claim 12, wherein a controlling menu comprising a plurality of options of the household appliance is displayed on the touch screen, and the control signal is sent to the household appliance when an option is operated.

14. The household appliance control method of claim 8, wherein a selection interface comprising a plurality of guiding paths started from a center of the touch screen is displayed on the touch screen, each guiding path corresponds to one of the household appliances and is configured to guide a user to slide along a corresponding guiding path to control the household appliances; when a sliding operation sliding along one of the guiding paths is detected, the control signal is sent to a corresponding household appliance.

* * * * *